US009232028B2

(12) United States Patent
Srinivasan et al.

(10) Patent No.: US 9,232,028 B2
(45) Date of Patent: Jan. 5, 2016

(54) PARALLELIZING PACKET CLASSIFICATION AND PROCESSING ENGINES

(71) Applicant: Oracle International Corporation, Redwood City, CA (US)

(72) Inventors: Arvind Srinivasan, San Jose, CA (US); Shimon Muller, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 162 days.

(21) Appl. No.: 13/909,429

(22) Filed: Jun. 4, 2013

(65) Prior Publication Data

US 2014/0269311 A1    Sep. 18, 2014

Related U.S. Application Data

(60) Provisional application No. 61/789,590, filed on Mar. 15, 2013.

(51) Int. Cl.
*H04L 29/06* (2006.01)
*H04L 12/851* (2013.01)
(52) U.S. Cl.
CPC ............ *H04L 69/22* (2013.01); *H04L 47/2441* (2013.01)

(58) Field of Classification Search
None
See application file for complete search history.

(56) References Cited

U.S. PATENT DOCUMENTS

| 2006/0039374 | A1* | 2/2006 | Belz et al. .................... 370/389 |
| 2008/0084866 | A1* | 4/2008 | Johnson et al. ............... 370/351 |
| 2010/0158009 | A1* | 6/2010 | Lee .................... H04L 47/2441 370/392 |
| 2011/0134915 | A1* | 6/2011 | Srinivasan .................... 370/389 |
| 2011/0200038 | A1* | 8/2011 | Panwar et al. ................ 370/388 |
| 2013/0015957 | A1* | 1/2013 | Moshfeghi .................... 340/10.2 |
| 2014/0226466 | A1* | 8/2014 | Pettersson et al. ............ 370/229 |
| 2014/0269311 | A1* | 9/2014 | Srinivasan et al. ............ 370/235 |

\* cited by examiner

*Primary Examiner* — Benjamin H Elliott, IV
(74) *Attorney, Agent, or Firm* — Park, Vaughan, Fleming & Dowler LLP; Steven E. Stupp

(57) ABSTRACT

An apparatus that recursively classifies packets includes a hierarchical set of classification engines that perform parallel classification of the packets in a packet processing queue. In particular, a first classification engine separates the packets based on physical-layer information and/or link-layer information in the packets. Then, second classification engines further separate the packets into multiple parallel pipelines based on layer information in the packets that is other than the physical-layer information and the link-layer information. The first classification engine and the second classification engines maintain a relative ordering of the packets in network sub-flows while allowing changes in relative ordering among different network flows.

20 Claims, 3 Drawing Sheets

PARALLELIZING PACKET CLASSIFICATION AND PROCESSING ENGINES

CROSS REFERENCE TO RELATED APPLICATION

This application claims priority under 35 U.S.C. §119(e) to U.S. Provisional Application Ser. No. 61/789,590, entitled "Parallelizing Packet Classification and Processing Engines," by Arvind Srinivasan and Shimon Muller, filed on Mar. 15, 2013, the contents of which is herein incorporated by reference.

BACKGROUND

1. Field

The disclosed embodiments generally relate to a packet-processing technique in communications networks. More specifically, the disclosed embodiments relate to a hierarchical technique for separating packets.

2. Related Art

Packet classification engines are used in many high-performance network processing systems to separate or classify packets into several parallel processing elements. This classification is usually performed to exploit the inherent parallelism present in network flows and associated applications, and to match this inherent parallelism to the parallelism provided by the processing elements.

As network speeds have increased and with virtualized applications, more of the offload classification is being handled in hardware. However, in the overall packet-processing path, a packet classification engine can become a potential bottleneck. Consequently, the packet classification engine typically needs to scale to match the speed and the amount of additional processing that it has to perform.

In a conventional classification framework, even though there may be multiple contexts with pipelines within the packet classification engine, the bottleneck usually is the time it takes to determine the processing queue where a given packet is sent. Note that the use of multiple pipelines within the packet classification engine may not always solve this problem. In particular, the depth of classification can vary from packet to packet based on the application. Furthermore, because pipelines are often unequal, scaling issues can occur. In addition, with some of the emerging tunneling standards, pipelined packet classification engines often do not scale.

Hence, what is needed is a packet classification engine that facilitates the separation of packets without the problems described above.

SUMMARY

One embodiment of the present disclosure provides an apparatus that recursively classifies packets. This apparatus includes a first classification engine that separates the packets based on at least one of physical-layer information and link-layer information in the packets. Moreover, the apparatus includes second classification engines, coupled to the first classification engine, which further separate the packets into multiple parallel pipelines based on layer information in the packets that is other than the physical-layer information and the link-layer information. The first classification engine and the second classification engines maintain a relative ordering of the packets in network sub-flows while allowing changes in the relative ordering among different network flows.

In some embodiments, the second classification engines further separate the packets based on network-layer information included in the packets. Furthermore, the apparatus may further include third classification engines, coupled to at least one of the second classification engines and at least some of the parallel pipelines, which further separate the packets based on transport-layer information in the packets. Additionally, the apparatus further may include fourth classification engines, coupled to at least one of the third classification engines and at least some of the parallel pipelines, which further separate the packets based on application-layer information in the packets.

Note that the apparatus may maintain an order of different classes of service so that the different classes of service avoid impacting each other during the recursive classification. Moreover, the packets may have different processing times for different classes of service and/or the network sub-flows may belong to the same class of service.

Another embodiment provides a system that recursively classifies the packets.

Another embodiment provides a method for recursively classifying the packets. During this method, the packets are separated using the first classification engine in the apparatus based on at least one of the physical-layer information and the link-layer information in the packets. Then, the packets are separated into the multiple parallel pipelines using the second classification engines in the apparatus based on the layer information in the packets that is other than the physical-layer information and the link-layer information, where the classifying maintains the relative ordering of the packets in the network sub-flows while allowing changes in the relative ordering between the different network flows. Next, the separating is recursively repeated using one or more additional classification engines.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
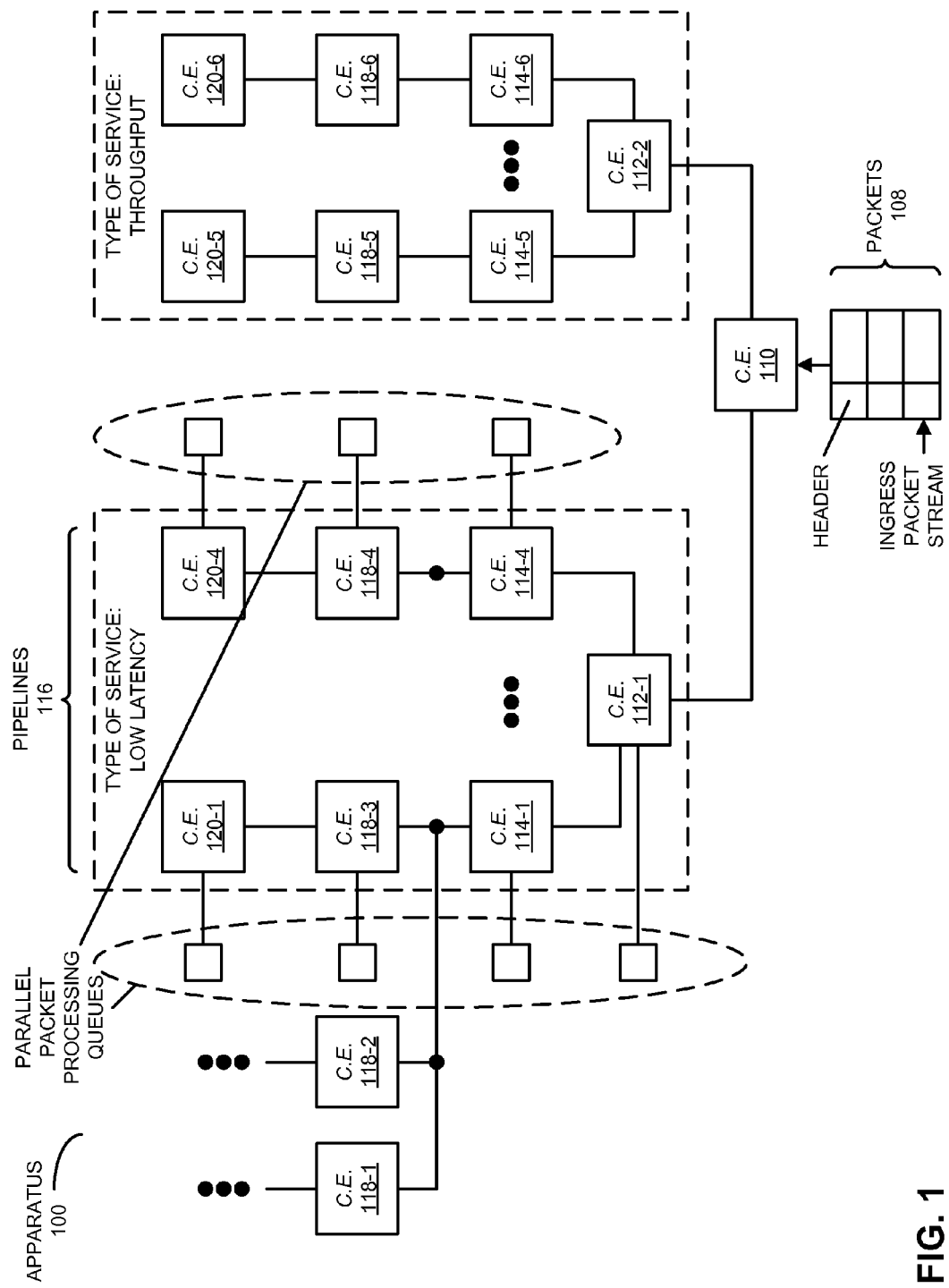
FIG. 1 is a block diagram illustrating an apparatus in accordance with an embodiment of the present disclosure.

Embodiments of an apparatus, a system that includes the apparatus, and a method for recursively classifying packets are described. This apparatus includes a hierarchical set of classification and processing engines (which are henceforth referred to as 'classification engines') that perform parallel classification of packets in a packet processing queue. In particular, a first classification engine (such as a shallow and, thus, faster classification engine) separates the packets based on physical-layer information and/or link-layer information in the packets. Then, second classification engines (such as deeper and, thus, slower classification engines) further separate the packets into multiple parallel pipelines based on layer information in the packets that is other than the physical-layer information and the link-layer information. The first classification engine and the second classification engines maintain a relative ordering of the packets in network sub-flows while allowing changes in relative ordering among different network flows.

By combining recursive classification engines, the classification technique facilitates classification based on a type of service that is required and a capacity of each classification engine in the hierarchy that is being targeted. Moreover, the classification engines in the classification technique can be extended to encompass stateful processing.

The classification technique may facilitate capabilities in which the depth of the classification is, in general, increased in subsequent stages. Moreover, the classification can be implemented in an efficient manner that readily scales at higher data rates. In the case of deep packet inspection, the classification technique may facilitate: flow-affinity-based packet queuing (e.g., InfiniBand queue pair states, etc.) and tunneling (e.g., Internet Protocol over InfiniBand or IPoIB, VXLAN, NVGRE, etc.); firewalls (which may be based on information associated with transport, session, presentation and application layers in an Open System Interconnections or OSI model); load balancing (which may be based on information associated with network and transport layers in the OSI model); stateful offloads (such as TCP offloading engine, secure socket layer, Internet Protocol security, etc.); and network-layer routing and switching (e.g., route-table lookup, packet-header manipulation, etc.). Moreover, in the case of shallow packet inspection, the classification technique may facilitate: packet switching and forwarding based on information associated with link and network layers in the OSI model; unicast versus multicast packet detection and forwarding; low-latency forwarding; and latency-sensitive control packet forwarding.

Furthermore, the classification technique may facilitate improved scaling at high data rates (such as in excess of tens of gigabits per second). In general, scaling during classification at high data rates can be difficult because each stage of packet processing typically takes up a finite amount of time before the packet moves to the next stage for further processing. This adds to the overall latency of processing for all packet classes, especially if serialized processing is done by one classification engine. In addition, some classes of service may require lower latency processing, while other classes of service may be more latency-tolerant but may be more throughput-sensitive.

By exploiting some of the parallelisms in the classification early in the hierarchy (e.g., based on the type of service required), the classification technique can alleviate some of the aforementioned serialization problems. For example, the type of service requested can be determined by the first classification engine, which may perform a fast, but shallow examination of the packet header. After one of the second classification engines is selected, the selected classification engine and its capabilities can be used to perform subsequent detailed packet inspection. Note that each classification engine in the hierarchy may further examine the packet header of interest in a shallow manner, and may then kick off additional stages in a progressively deeper classification process. For example, with tunneled packets, each stage of classification performed in the hierarchy may only examine the OSI layer(s) that it is working on, and then may start the next or subsequent classification stage or process in a recursive manner.

We now describe embodiments of the apparatus. FIG. 1 presents a block diagram illustrating an apparatus 100. This apparatus includes a classification engine (C.E.) 110 that separates packets 108 based on at least one of physical-layer information and link-layer information in the OSI model, which are included in packets 108 (such as in headers). For example, the physical-layer information may include the port of arrival, and the link-layer information may include the Media Access Control address and the Virtual LAN tag. Note that packets 108 may be associated with one or more: network flows, policies (e.g., for a switch) and/or services.

Moreover, apparatus 100 includes subsequent classification engines 114, coupled to classification engine 110, which further separate packets 108 into multiple parallel pipelines 116 based on layer information in the OSI model, which is included in packets 108, and which is other than the physical-layer information and the link-layer information. Note that classification engine 110 and classification engines 114 maintain a relative ordering of packets 108 in network sub-flows while allowing changes in the relative ordering among different network flows.

For example, second classification engines 114 may further separate packets 108 based on network-layer information in the OSI model, which is included in the packets. In particular, the network-layer information may include packet forwarding protocols and techniques, such as switching or routing.

In some embodiments, the hierarchy includes one or more additional stages. In particular, apparatus 100 may include classification engines 118, coupled to at least one of classification engines 114 and at least some of parallel pipelines 116, which further separate packets 108 based on transport-layer information in the OSI model, which is included in packets 108. For example, the transport-layer information may include end-to-end communication services for applications in a layered architecture of network components and protocols, such as: connection-oriented data stream support (such as the transmission control protocol), reliability, flow control, and multiplexing. As shown in FIG. 1, apparatus 100 may include multiple recursive classification stages, such as classification engines 118-1 and 118-2, which branch off after classification engine 114-1. Additionally, apparatus 100 may include classification engines 120, coupled to at least one of classification engines 118 and at least some of parallel pipelines 116, which further separate packets 108 based on application-layer information in the OSI model, which is included in packets 108. For example, the application-layer information may include communication protocols and process-to-process communications across an Internet Protocol. Thus, the application-layer information may include applications or services associated with packets 108.

Classification engines 112, 114, 118 and 120 in apparatus 100 may each optionally output packets 108 to one or more piplelines to processing queues or nodes. (For clarity in FIG. 1, the processing queues are only shown for the classification engines in the low-latency type of service. While these processing queues are not shown in the throughput type of service, they are also included.)

By implementing classification of packets 108 in a cascaded or hierarchical manner, in which the depth of the classification is, in general, increased in subsequent stages, the classification can be implemented in an efficient manner that readily scales at higher data rates. (Note, however, that the classification at any given stage in the hierarchy can be shallow or deep, i.e., the classification may use information in packets 108 that is readily accessed or that may require more processing.) Moreover, the number of classification engines in apparatus 100 may increase as packets 108 progress through the hierarchy. However, while the classification technique is illustrated in FIG. 1 with a hierarchical structure, note that a given classification engine in a particular stage (such as classification engine 114-1) may separate a given packet in: a shorter time than classification engine 110; the same amount of time as classification engine 110; or a long time than classification engine 110.

Note that apparatus 100 may maintain an order of different classes of service so that the different classes of service avoid impacting each other during the recursive classification. Moreover, packets 108 may have different processing times for different classes of service (for example, packets 108 may have different sizes) and/or the network sub-flows may belong to the same class of service. The different classes of service may be indicated by one or more packet headers in the operating-system stack. The multiple recursive classification engines in the branches of apparatus 100 may allow these different classes of service to be processed using different pipelines.

In an exemplary embodiment, classification engine 110 is a shallow classification stage that is a precursor to the main classification stage in classification engines 112. For example, based on the type of service needed (e.g., low latency) for a given packet, classification engine 110 may choose or select the appropriate next classification engine (such as one of classification engines 114), and then may provide the given packet to the selected classification engine. This classification technique parallelizes the classification stages, with each subsequent stage capable of further fine-grained or deeper parallel processing.

In case of InfiniBand networks, the first (shallow) classification stage implemented using classification engine 110 may perform a lookup of the destination local identifier (DLID) and service level/virtual lanes (SL/VLs). If the DLIDs are assigned for low-latency operations, the packets may be moved into the required output queues for the multiple pipelines. The next classification stage using classification engines 114 may look-up global routing headers (GRH) and any tunneling headers (such as Ethernet/Internet Protocol over InfiniBand). Next, the subsequent classification stage may involve lookup of media access control/virtual local area network (MAC/VLAN) headers.

Based on the service levels of the packets at each level in the hierarchy, the packets can be potentially processed in an out-of-order manner. This capability may facilitate prioritizing latency-sensitive traffic to be classified and moved out of the ingress queue while other traffic requiring deeper packet classification is still being processed. Even in the deep packet classification queues, there may be various levels of processing capability, such as: differentiating and offloading user-datagram-protocol versus transmission-control-protocol packet streams (i.e., stateless vs. stateful), Internet Protocol version 4 versus Internet Protocol version 6 (i.e., more depth of classification), tunneled packets, etc.

Note that the shallow classification stage implemented using classification engine 110 can also be used to load balance some of the service levels that each classification engine can provide. In this way, various levels of processing pipelines can be created to provide different qualities of service, such as: fast, medium and slow packet processing.

In an exemplary embodiment, classification engine 110 may process multiple network-layer flows, which can be easily identified from information in packet headers. Then, classification engines 114 may process transport-layer information (which typically takes more time). Furthermore, classification engine 110 may split the network layer flows into 'fast' flows (such as those that are exclusively associated with the network layer) and 'slower' flows (such as those that will involve transport-layer processing).

In another exemplary embodiment, classification engine 110 may perform classification based on link-layer information. Consequently, there may not be a need for packet storage at this classification stage. Once the type of service is determined (for example, based on the media-access-control address, unicast versus multicast, etc.), the packets may be passed on to subsequent classification stages. For example, classification engine 114-2 may classify packets 108 based on network-layer information (which typically takes more time). Therefore, processing by classification engine 114-2 may be reserved for longer packets in services that are less sensitive to latency.

Figure 2:
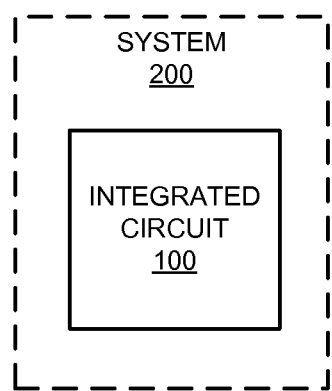
FIG. 2 is a block diagram illustrating a system that includes the apparatus of FIG. 1 in accordance with an embodiment of the present disclosure.

A system 200 that includes apparatus 100 is shown in FIG. 2. In general, functions of the apparatus and the system may be implemented in hardware and/or in software. Thus, the system may include one or more program modules or sets of instructions stored in an optional memory subsystem (such as DRAM or another type of volatile or non-volatile computer-readable memory), which may be executed by an optional processing subsystem. Note that the one or more computer programs may constitute a computer-program mechanism. Furthermore, instructions in the various modules in the optional memory subsystem may be implemented in: a high-level procedural language, an object-oriented programming language, and/or in an assembly or machine language. The programming language may be compiled or interpreted, e.g., configurable or configured, to be executed by the processing subsystem.

Components in the system may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, the system may be at one location or may be distributed over multiple, geographically dispersed locations.

Note that the system may include: a VLSI circuit, a switch, a hub, a bridge, a router, a communication system (such as a WDM communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Moreover, a given computer system may be at one location or may be distributed over multiple, geographically dispersed locations.

Furthermore, the embodiments of the apparatus and/or the system may include fewer components or additional components. For example, there may be fewer or more classification engines and/or classification stages in apparatus 100 (FIG. 1). Although these embodiments are illustrated as having a number of discrete items, the apparatus and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the apparatus and/or the system may be implemented more in hardware and less in software, or less in hardware and more in software, as is known in the art.

An output of a process for designing an integrated circuit, or a portion of the integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

Figure 3:
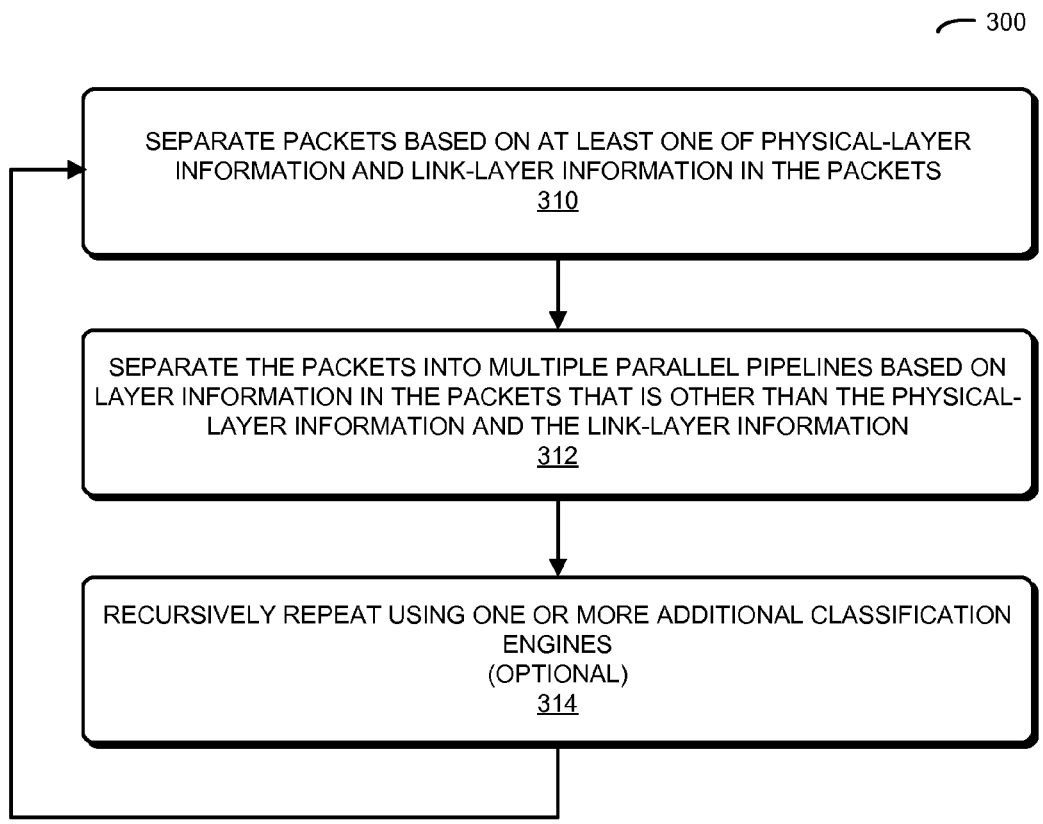
FIG. 3 is a flow chart illustrating a method for separating packets in accordance with an embodiment of the present disclosure.

We now describe the method. FIG. 3 presents a flow chart illustrating a method 300 for recursively classifying packets, which may be performed by an apparatus (such as apparatus 100 in FIG. 1). During this method, the packets are separated using a first classification engine in the apparatus based on at least one of physical-layer information and link-layer information in the packets (operation 310). Then, the packets are separated into multiple parallel pipelines using second classification engines in the apparatus based on layer information in the packets that is other than the physical-layer information and the link-layer information (operation 312), where the classifying maintains the relative ordering of the packets in network sub-flows while allowing changes in the relative ordering among different network flows. Next, the separation of the packets (operations 310 and 312) is optionally recursively repeated using one or more additional classification engines (operation 314).

In some embodiments of method 300, there are additional or fewer operations. For example, the same or additional classification engines may further separate the packets based on: network-layer information, transport-layer information and/or application-layer information. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An apparatus configured to recursively classify packets, comprising:
   a first classification engine, at a first hierarchical level, configured to separate the packets based on at least one of physical-layer information and link-layer information in the packets; and
   second classification engines, at a second hierarchical level, coupled to the first classification engine, configured to further separate the packets into multiple parallel pipelines based on layer information in the packets that is other than the physical-layer information and the link-layer information, wherein the first classification engine and the second classification engines maintain a relative ordering of the packets in network sub-flows while allowing changes in the relative ordering among different network flows,
   wherein the second hierarchical level is deeper than the first hierarchical level in a hierarchy for the first classification engine and the second classification engines.

2. The apparatus of claim 1, wherein the second classification engines further separate the packets based on network-layer information included in the packets.

3. The apparatus of claim 2, wherein the apparatus further includes third classification engines coupled to at least one of the second classification engines and at least some of the parallel pipelines; and
   wherein the third classification engines are configured to further separate the packets based on transport-layer information in the packets.

4. The apparatus of claim 3, wherein the apparatus further includes fourth classification engines coupled to at least one of the third classification engines and at least some of the parallel pipelines; and
   wherein the fourth classification engines are configured to further separate the packets based on application-layer information in the packets.

5. The apparatus of claim 3, wherein the third classification engines are at a third hierarchical level that is deeper in the hierarchy than the second hierarchical level.

6. The apparatus of claim 5, wherein the second classification engines receive the packets from the first classification engine, and wherein the third classification engines receive at least some of the packets from the at least one of the second classification engines.

7. The apparatus of claim 1, wherein the apparatus is configured to maintain an order of different classes of service so that the different classes of service avoid impacting each other during the recursive classification.

8. The apparatus of claim 1, wherein the packets have different processing times for different classes of service.

9. The apparatus of claim 1, wherein the network sub-flows belong to a same class of service.

10. The apparatus of claim 1, wherein, for a given packet in the packets, the first classification engine selects a next classification engine from the second classification engines based on a latency needed for the given packet and sends the given packet to the next classification engine.

11. A system configured to recursively classify packets, comprising:
- a first classification engine, at a first hierarchical level, configured to separate the packets based on at least one of physical-layer information and link-layer information in the packets; and
- second classification engines, at a second hierarchical level, coupled to the first classification engine, configured to further separate the packets into multiple parallel pipelines based on layer information in the packets that is other than the physical-layer information and the link-layer information, wherein the first classification engine and the second classification engines maintain a relative ordering of the packets in network sub-flows while allowing changes in the relative ordering among different network flows,
- wherein the second hierarchical level is deeper than the first hierarchical level in a hierarchy for the first classification engine and the second classification engines.

12. The system of claim 11, wherein the second classification engines further separate the packets based on network-layer information included in the packets.

13. The system of claim 12, wherein the system further includes third classification engines coupled to at least one of the second classification engines and at least some of the parallel pipelines; and
- wherein the third classification engines are configured to further separate the packets based on transport-layer information in the packets.

14. The system of claim 13, wherein the system further includes fourth classification engines coupled to at least one of the third classification engines and at least some of the parallel pipelines; and
- wherein the fourth classification engines are configured to further separate the packets based on application-layer information in the packets.

15. An apparatus-implemented method for recursively classifying packets, wherein the method comprises:
- using a first classification engine, at a first hierarchical level in the apparatus, separating the packets based on at least one of physical-layer information and link-layer information in the packets;
- using second classification engines, at a second hierarchical level in the apparatus, separating the packets into multiple parallel pipelines based on layer information in the packets that is other than the physical-layer information and the link-layer information, wherein the classifying maintains a relative ordering of the packets in network sub-flows while allowing changes in the relative ordering among different network flows; and
- recursively repeating the separating of the packets using one or more additional classification engines,
- wherein the second hierarchical level is deeper than the first hierarchical level in a hierarchy for the first classification engine and the second classification engines.

16. The method of claim 15, wherein separating the packets using the second classification engines is based on network-layer information included in the packets.

17. The method of claim 16, wherein the method further comprises separating the packets using third classification engines based on transport-layer information in the packets.

18. The method of claim 17, wherein the method further comprises separating the packets using fourth classification engines based on application-layer information in the packets.

19. The method of claim 15, wherein the separating operations maintain an order of different classes of service so that the different classes of service avoid impacting each other during the recursive classification.

20. The method of claim 15, wherein the packets have different processing times for different classes of service.

* * * * *